United States Patent [19]
Huber et al.

[11] Patent Number: 5,331,449
[45] Date of Patent: Jul. 19, 1994

[54] OPTICAL FIBER TREE AND BRANCH NETWORK FOR AM SIGNAL DISTRIBUTION

[75] Inventors: David R. Huber, Warrington, Pa.; Douglas W. Hall, Corning; Edward F. Murphy, Painted Post, both of N.Y.

[73] Assignees: General Instrument Corporation, Hatboro, Pa.; Corning Incorporated, Corning, N.Y.

[21] Appl. No.: 31,633

[22] Filed: Mar. 15, 1993

Related U.S. Application Data

[62] Division of Ser. No. 454,772, Dec. 22, 1989, Pat. No. 5,210,631.

[51] Int. Cl.⁵ .................. H04J 14/02; H01S 3/00
[52] U.S. Cl. ........................... 359/125; 359/134; 359/160; 359/341; 348/6
[58] Field of Search ............... 359/125, 120-121, 359/132-134, 157, 160, 180, 188, 341; 372/6; 358/86

[56] References Cited

U.S. PATENT DOCUMENTS

| | | | |
|---|---|---|---|
| Re. 29,103 | 1/1977 | Wilson et al. | 372/90 |
| 3,729,690 | 4/1973 | Snitzer | 372/40 |
| 4,183,054 | 1/1980 | Patisaul et al. | 358/86 |
| 4,809,362 | 2/1989 | Claus et al. | 359/120 |
| 4,962,995 | 10/1990 | Andrews et al. | 372/6 |
| 5,012,484 | 4/1991 | Flynn et al. | 372/45 |
| 5,027,079 | 6/1991 | Desurvire et al. | 372/6 |
| 5,042,039 | 8/1991 | Edagawa et al. | 372/6 |
| 5,050,183 | 9/1991 | Duling, III | 372/6 |
| 5,153,763 | 10/1992 | Pidgeon | 359/133 |
| 5,210,631 | 5/1993 | Huber et al. | 359/125 |

OTHER PUBLICATIONS

Way et al., "Multi-Channel AM-VSB Television Signal Transmission Using an Erbium-Doped Optical Fiber Power Amplifier" Jul. 20, 1989, IOOC Kobe Japan 1989-pp. 30-31.
Wagner et al., "Evolutionary Architectural and Techniques for Video Distribution on Fiber", IEEE Communication Magazine pp. 17-22. Dec. 1989.
Green et al., "Direct Detection Lightwave Systems: Why Pay More?" IEEELCS, Nov. 1990, pp. 36-48.
Olshansky, "A Migration Path to BISDN", IEEELCS, Aug. 1990.
Monteith et al., "The first Canadian Fiberoptic CATV Trunking System" IEEE Transaction on CATV, vol. CATV-4, No. 2, Apr. 1979-pp. 63-69.
A. A. M. Saleh, et al., "Nonlinear Distortion Due to Optical Amplifiers in Subcarrier-Multiplexed Lightwave Communications Systems," *Electronics Letters*, vol. 25, No. 1, pp. 79-80, Jan. 1989.
R. Olshansky, et al., "Microwave-Multiplexed Wideband Lightwave Systems Using Optical Amplifiers for Subscriber Distribution," *Electronics Letters*, vol. 24, No. 15, pp. 922-923, Jul. 1988.
R. Olshansky, et al., "Subcarrier Multiplexed Passive Optical Network for Low-Cost Video Distribution," presented at OFC 1989.
W. I. Way, et al., "Carrier-to-Noise Ratio Performance of a Ninety-Channel FM Video Optical System Employing Subcarrier Multiplexing and Two Cascaded Traveling-Wave Laser Amplifiers," presented at OFC Jul. 1989.
E. Desurvire, et al., "High-Gain Erbium-Doped Traveling-Wave Fiber Amplifier," *Optics Letters*, vol. 12, No. 11, Nov. 1987, pp. 888-890.
L. Stark, "AM Transmission on Fiber," *Communications Engineering and Design*, Apr. 1988.

Primary Examiner—Richard E. Chilcot, Jr.
Assistant Examiner—Kinfe-Michael Negash
Attorney, Agent, or Firm—Barry R. Lipsitz

[57] ABSTRACT

The use of a doped optical fiber amplifier enables the transmission of multi-channel AM-VSB television signals. An Erbium doped fiber amplifier is disclosed. The amplifier is also useful for reducing second order distortion products produced in an amplitude modulated subcarrier optical communication system. The amplifier may be used in a tree and branch structure optical fiber television network.

9 Claims, 4 Drawing Sheets

OPTICAL FIBER TREE AND BRANCH NETWORK FOR AM SIGNAL DISTRIBUTION

This application is a divisional of copending U.S. patent application Ser. No. 07/454,772 filed on Dec. 22, 1989, now U.S. Pat. No. 5,210,631.

BACKGROUND OF THE INVENTION

The present invention relates to fiber optic communication systems, and more particularly to apparatus for transmitting amplitude modulated vestigial-sideband ("AM-VSB") television signals over an optical fiber television system.

Cable television systems currently distribute television program signals via coaxial cable, typically arranged in tree and branch networks. Coaxial cable distribution systems require a large number of high bandwidth electrical amplifiers. For example, 40 or so amplifiers may be required between the cable system headend and an individual subscriber's home.

The use of a television signal comprising amplitude modulated vestigial—sideband video subcarriers is preferred in the distribution of cable television signals due to the compatibility of that format with NTSC television standards and the ability to provide an increased number of channels within a given bandwidth. An undesirable characteristic of AM-VSB transmission, however, is that it requires a much higher carrier-to-noise ratio (CNR) than other techniques, such as frequency modulation or digital transmission of video signals. Generally, a CNR of at least 40 dB is necessary to provide clear reception of AM-VSB television signals.

The replacement of coaxial cable with optical fiber transmission lines in television distribution systems has become a high priority. Production single mode fiber can support virtually unlimited bandwidth and has low attenuation. Accordingly, a fiber optic distribution system or a fiber-coax cable hybrid would provide substantially increased performance at a competitive cost as compared to prior art coaxial cable systems.

One problem in implementing an optical fiber distribution system, particularly for AM-VSB signals, is that the lasers used to transmit the television signal information inherently introduce distortion, most notably as a result of second and third order harmonics produced by the nonlinearities of the laser.

Amplification of optical signals within a fiber optic network has also been a problem in the attempt to distribute AM-VSB television signals. As noted above, amplifiers are required between a cable system headend and a subscriber's home in order to provide signals to the subscriber at an acceptable power level. Semiconductor optical amplifiers of the type typically used in fiber optic systems produce high levels of distortion products that are not compatible with multi-channel AM-VSB video signals. This is due to the short lifetime of the carrier excited state within the semiconductor optical amplifier. The recombination time of such an amplifier operating near 1.3 $\mu$m or 1.5 $\mu$m is about 1.2 nanoseconds, which is short compared to the period of a typical AM-VSB subcarrier operating in the cable television band of about 55.25 MHz-1 GHz.

The dependence of second order distortion on carrier lifetime in a semiconductor optical amplifier is discussed in A.A.M. Saleh, et al., "Nonlinear Distortion Due to Optical Amplifiers in Subcarrier-Multiplexed Lightwave Communications Systems" *Electronics Letters,* Vol 25, No 1, pp 79–80, 1989. As noted in that article, second order nonlinear distortion is a significant problem in proposed lightwave cable television home distribution systems, where the use of semiconductor amplifiers to overcome inevitable distribution losses can potentially degrade system performance appreciably.

The difficulties presented in transmitting multi-channel AM-VSB television signals over fiber optic distribution systems have led others to propose the use of frequency modulation ("FM") instead of the more desirable AM-VSB format. See, e.g., R. Olshansky, et al., "Microwave-Multiplexed Wideband Lightwave Systems Using Optical Amplifiers for Subscriber Distribution", *Electronics Letters,* Vol. 24, No. 15, pp. 922–923, 1988; R. Olshansky, et al,. "Subcarrier Multiplexed Passive Optical Network for Low-Cost Video Distribution", presented at OFC 1989; and W. I. Way, et al., "Carrier-to-Noise Ratio Performance of a Ninety-Channel FM Video Optical System Employing Subcarrier Multiplexing and Two Cascaded Traveling-Wave Laser Amplifiers", presented at OFC 1989. Another proposal has been to convert AM-VSB signals to a digital format for transmission. Digital transmission of AM-VSB television signals over an optical communication link is described in U.S. Pat. No. 4,183,054 to Patisaul, et al., entitled "Digital, Frequency-Translated, Plural-Channel, Vestigial Sideband Television Communication System".

It would be advantageous to provide an apparatus and method for transmitting AM-VSB television signals over a fiber optic distribution system in analog form. It would be further advantageous to provide a means for reducing second order distortion in an amplitude modulated subcarrier optical communication system. The present invention provides such advantages.

SUMMARY OF THE INVENTION

In accordance with the present invention, amplitude modulated vestigial sideband signals are transmitted over an optical fiber. Light from a light source, such as a laser, is modulated with a signal having an AM-VSB subcarrier. The modulated light is passed through an optical amplifier having a long excited state lifetime with respect to the period of the subcarrier. Means are provided for coupling the amplified modulated light output from the amplifier to an optical fiber. The optical fiber may, in turn, be coupled to a tree and branch structure cable television distribution network.

In one embodiment, the modulating signal comprises a television signal having a plurality of television channels, each containing a video subcarrier having a period of substantially shorter duration than the excited state lifetime of the amplifier to virtually eliminate the adverse effects of second order distortion components. The amplifier can be a doped fiber amplifier comprising, for example, an Erbium doped fiber. The light source is preferably a laser operating at or near a wavelength at which the amplifier exhibits a gain peak. A doped fiber amplifier in accordance with the invention can comprise an optical coupler having a first input to receive the modulated light, a second input for receiving light from a pump laser, and an output for coupling a signal comprising the combined inputs to an amplifying fiber such as an Erbium doped fiber.

The present invention also provides apparatus and a method for reducing second order distortion in an amplitude modulated subcarrier optical communication system. In accordance with the invention, a doped fiber optical amplifier is coupled to an optical communication system. An AM subcarrier modulated optical beam is passed through the amplifier, whereby second order distortion components in the subcarrier are reduced. The amplifier may comprise, for example, an Erbium doped fiber amplifier, pumped with a laser operating in a known pump band, such as 665 nanometers, that is operated at a power level where a portion of the amplifier has a low level of inversion. The signal wavelength is placed in the optical spectrum at a wavelength at which the amplifier exhibits gain, and may be modulated with an AM-VSB video subcarrier having a period of substantially shorter duration than the excited state lifetime of the amplifier.

An optical fiber tree and branch network is also provided for distributing AM subcarrier multiplexed information. A first optical fiber splitter has an input for receiving a modulated light signal carrying multiplexed AM subcarriers. The splitter has a plurality of outputs for distributing the light signal. Means are provided for amplifying the light signal with an optical amplifier having a long excited state lifetime with respect to the periods of the subcarriers. The network can comprise a plurality of additional optical fiber splitters, each having an input for receiving the light signal from an output of a previous splitter and a plurality of outputs for distributing the light signal. The amplifying means can comprise a plurality of doped fiber amplifiers, each amplifying the light signal input to a different splitter. The amplifiers can comprise Erbium doped fiber amplifiers. The light signal may be provided by a laser modulated with a cable television signal containing a plurality (e.g., 30 or more) channels of AM subcarrier video information.

DETAILED DESCRIPTION OF THE INVENTION

Figure 1:
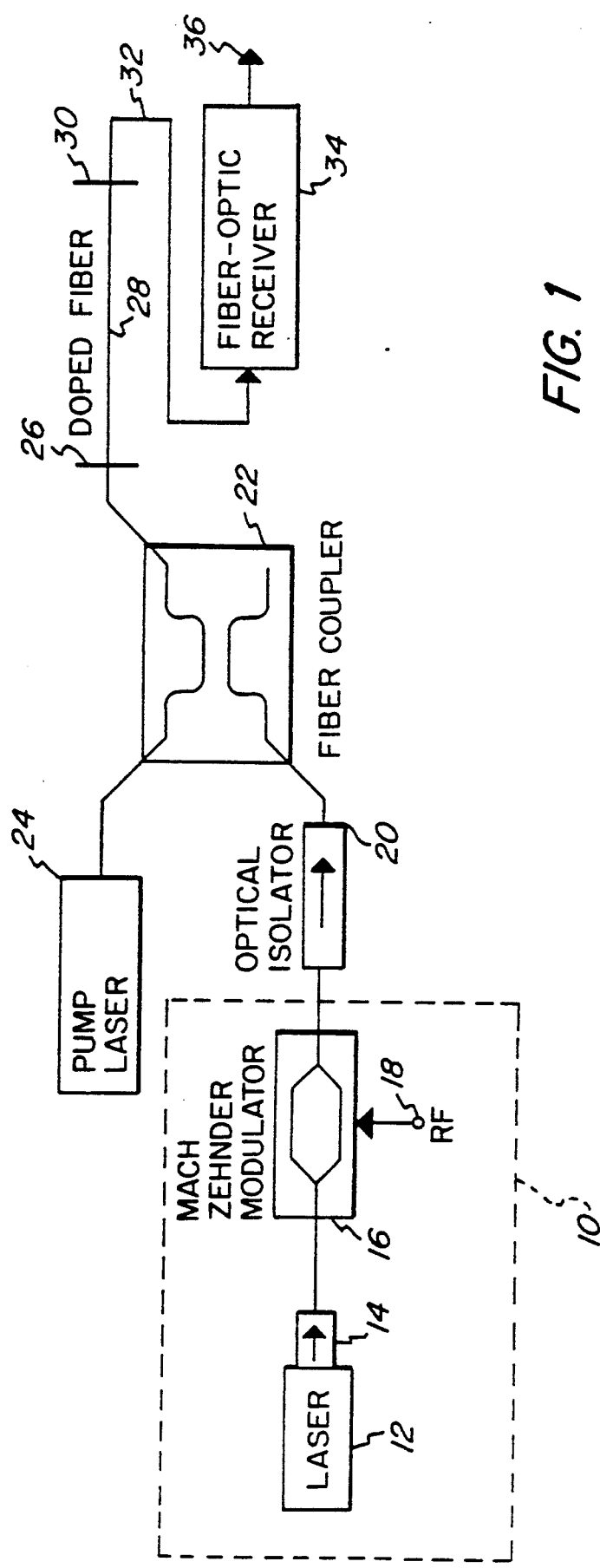
FIG. 1 is a block diagram illustrating the apparatus of the present invention.

The apparatus and method of the present invention enable the transmission of a multi-channel AM-VSB television signal over an optical fiber. Second order distortion components produced in the video subcarriers by a signal laser are reduced.

A modulated light source 10 can comprise a semiconductor laser 12 or other laser coupled to pass a coherent light beam at a specified wavelength through an optical isolator 14. Isolator 14 prevents optical reflections. This allows the laser to operate in a stable manner. An external modulator 16, such as a Mach Zehnder modulator receives the light from laser 12 and modulates the beam with an RF signal applied at terminal 18. The RF signal may comprise, for example, a multi-channel AM-VSB television signal. Another optical isolator 20 is provided at the output of modulator 18. Isolator 20 buffers the modulator from a fiber coupler 22 in a conventional manner. Those skilled in the art will appreciate that other types of modulated light sources can be substituted for the laser and external modulator light source 10. For example, a DFB laser or external cavity laser can be directly modulated with an RF signal as well known in the art.

The output from modulated light source 10 is coupled to one input of a fiber coupler 22. Another input of fiber coupler 22 is driven by a pump laser 24, which operates in a known pump band for a doped fiber 28 that forms an optical amplifier in combination with pump laser 24 and fiber coupler 22. Fiber 28 is coupled to the output of fiber coupler 22 via a conventional fiber connector 26. Doped fiber 28 is preferably a single-mode fiber, and in the preferred embodiment is a silica-based Erbium ($Er^{3+}$) doped fiber. Other rare earths and other host glasses are possible. For example, Nd in ZBLN glass can be used. The output of the amplifier is coupled to a conventional optical fiber 32 using a connector 30 well known in the art. The signal distributed over optical fiber 32 is received at fiber optic receiver 34 (e.g., at a CATV subscriber location) and the information contained therein is output at terminal 36 for its intended end use.

The specifications for the various components illustrated in FIG. 1 are dependent on the requirements of the intended application of the system. In a CATV application, the doped fiber amplifier must be capable of supporting AM subcarrier video information. In order to accomplish this, the excited state lifetime of the amplifier must be long with respect to the period of the subcarrier itself. An Erbium doped fiber has an excited state lifetime of approximately 15 milliseconds, and has been found to operate well in connection with AM subcarrier transmission of multiple channel video. Tests in connection with the development of the present invention showed that for a twenty-tone (channel) test, the composite second order products ("CSO") and composite triple beat products ("CTB") were lower than 55 dBc. Other tests indicate that intermodulation distortion does not increase as the amplifier begins and operates under conditions of gain saturation. Thus, it appears that the actual saturation power of the fiber amplifier is not too important so long as adequate power level and gain are supported. For AM-VSB video transmission an amplifier gain of 14–17 dB and power levels of +10 dBm to +16 dBm should prove satisfactory for use in a CATV distribution network. It is preferable that such a network maintain intermodulation distortion at less than 60–70 dBc for both CSO and CTB products. It is also preferable that the carrier-to-noise ratio ("CNR") be greater than 60 dB for each channel, and that at least 40 subcarrier channels be supported.

The present invention resulted in part from applicants' discovery that fiber optical amplifiers appear to demonstrate coherent subcarrier intermodulation distortion, and the recognition that this phenomenon is useful in reducing the second order products produced in amplitude modulated subcarrier optical communication systems. As noted, the transmission of AM subcarrier multiplexed video information places stringent requirements on the optical source and on any optical amplifier in the transmission link. The dominant distortion products produced by directly modulated semiconductor lasers are second order. Typical state of the art semiconductor lasers have composite second order products that are too large for 40 channel AM subcarrier video transmission. In accordance with the present invention, the second order products may be reduced by passing the AM subcarrier modulated optical beam through a doped fiber optical amplifier. This has been verified through the testing of an Erbium ($Er^{3+}$) fiber optical amplifier in the structure illustrated in FIG. 1. It is noted that other structures may also be used. For example, the beam from pump laser 24 can be counterpropagated through the doped fiber with respect to the beam from modulated light source 10.

In testing the structure illustrated in FIG. 1, pump laser 24 was a dye laser operating at 665 nm. Pump laser 24 was a Coherent Laser model 702 modified to produce continuous wave light at 665 nm. The pump power was about 100 mW. Doped fiber 28 was a step index single mode silica-based fiber having a length of 2.5 meters, a cutoff wavelength of about 1.25 $\mu$m, an $Er^{3+}$ dopant concentration of about 447 ppm, and a numerical aperture ("NA") of 0.16. Coupler 22 was a wavelength division multiplexing ("WDM") fused-fiber coupler. Such couplers are available from Corning Glass Works under the designation "Multiple Index Coupler". Each of the system connectors was a Radiall series VFO-DF connector (part number F716 002 000) having a reflected power below 55 dB. An RF spectrum analyzer was coupled to the output of fiber optic receiver 34 at terminal 36. Fiber 32 was a conventional telephone communication fiber, manufactured by Corning Glass Works and designated SMF-21 fiber.

Figure 2:
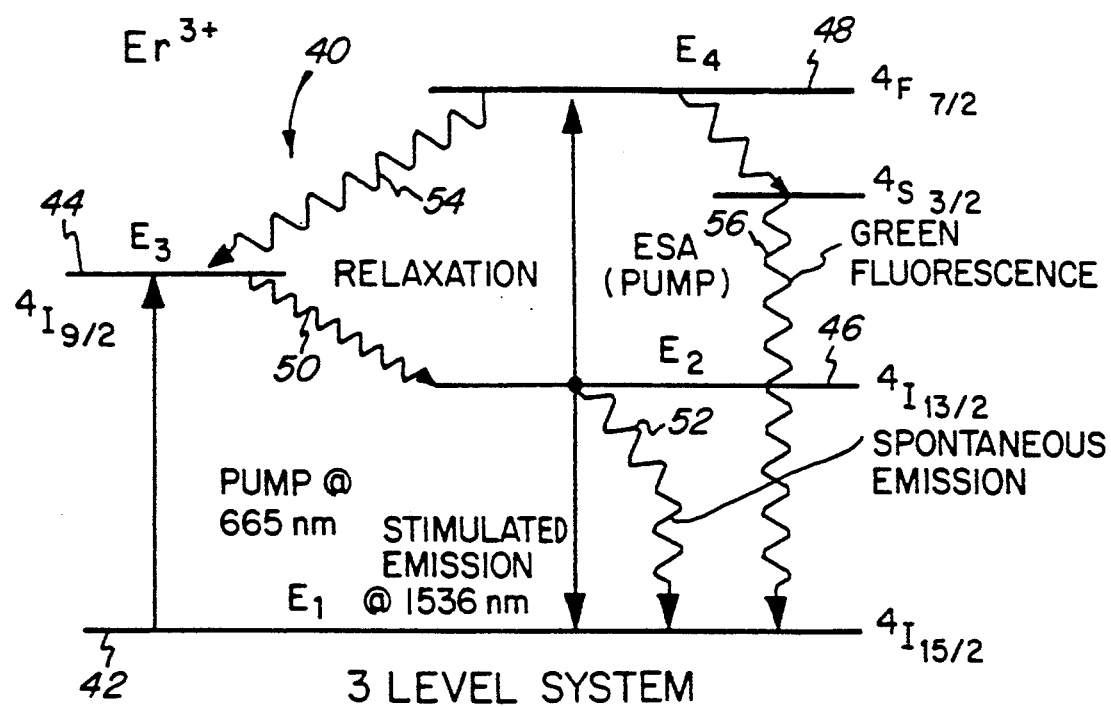
FIG. 2 is an energy level diagram of an Erbium doped fiber amplifier.

An energy level diagram 40 for an Erbium fiber amplifier is illustrated in FIG. 2. At a pump wavelength of 665 nm, the energy of Erbium ions increased from a level $E_1$ shown at 42 to an energy level $E_3$ shown at 44. Relaxation then occurred, as indicated at 50, to an excited state $E_2$ shown at 46. Spontaneous emission occurred as indicated at 52, resulting in an excited state lifetime of approximately 15 milliseconds. An additional energy state $E_4$, as shown at 48, was also reached resulting in a relaxation 54 and a green fluorescence 56 outside of the operating range of the present system. Those skilled in the art will appreciate that the pump laser may be operated at different wavelengths, such as 980 nm or 1480 nm instead of the 665 nm wavelength used in the present example.

Figure 3:
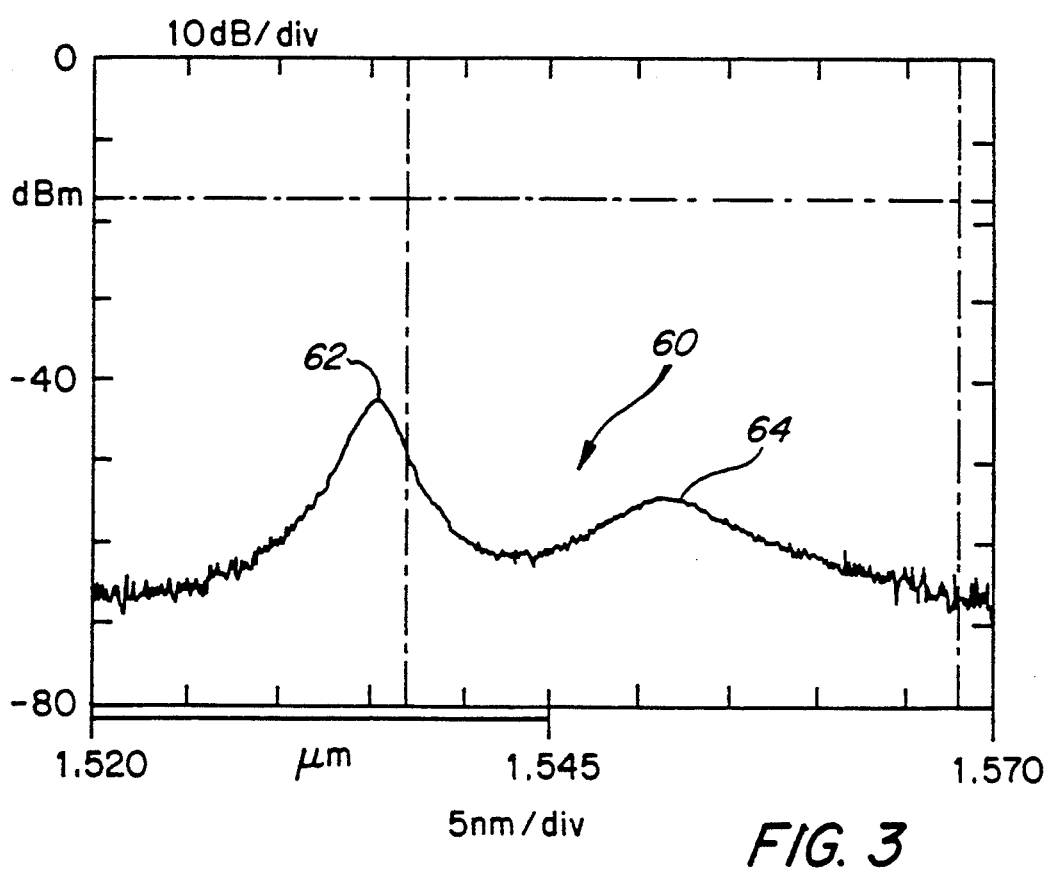
FIG. 3 is a graph showing the spontaneous emission spectra of an Erbium fiber amplifier that has been used in the testing of the present invention.

The spontaneous emission spectra for the amplifier is shown in FIG. 3. Curve 60 illustrates the emission from the amplifier while being pumped by pump laser 24, but with no input from modulated light source 10. As shown, the spectra includes two gain peaks. Gain peak 62 occurred at approximately 1536 nm and gain peak 64 occurred at approximately 1552 nm. In using the fiber amplifier in a communication system, it is preferable to operate the amplifier at or near a gain peak to achieve the desired amplification. When the amplifier is used in the distribution of a multi-channel AM-VSB television signal, high gain is not as important as in other potential applications. It may be preferable to operate the amplifier at gain peak 64 (e.g., around 1552 nm) which exhibits a higher saturation power, allowing the use of signal lasers with higher power. It is noted that for particular applications, the spontaneous emission of the fiber amplifier, and therefore the wavelengths at which the gain peaks occur, can be adjusted by adding co-dopants (e.g., alumina or germanium) to the doped fiber.

Figure 4:
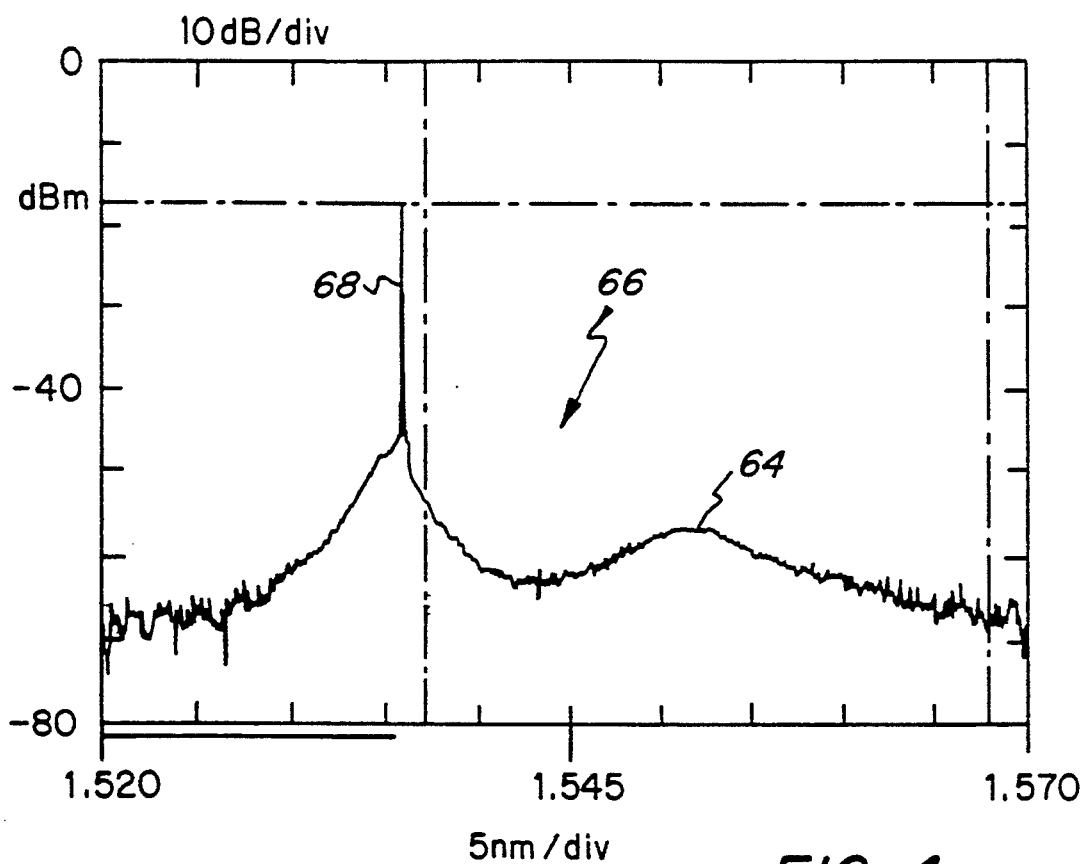
FIG. 4 is a graph showing the stimulated emission spectra of a 1536 nanometer signal source at the output of the Erbium doped fiber amplifier.

Testing of the amplifier was conducted at a wavelength of 1536 nm, corresponding to gain peak 62 of FIG. 3. FIG. 4 illustrates the output of the optical amplifier showing an amplified signal from modulated light source 10 at 1536 nm. Light source 10 was operated to provide a signal power of 8.91 $\mu$w to the amplifier. Curve 66 includes the amplified signal 68 as well as the 1552 nm gain peak 64 resulting from the spontaneous emission of the fiber amplifier.

Figure 5:
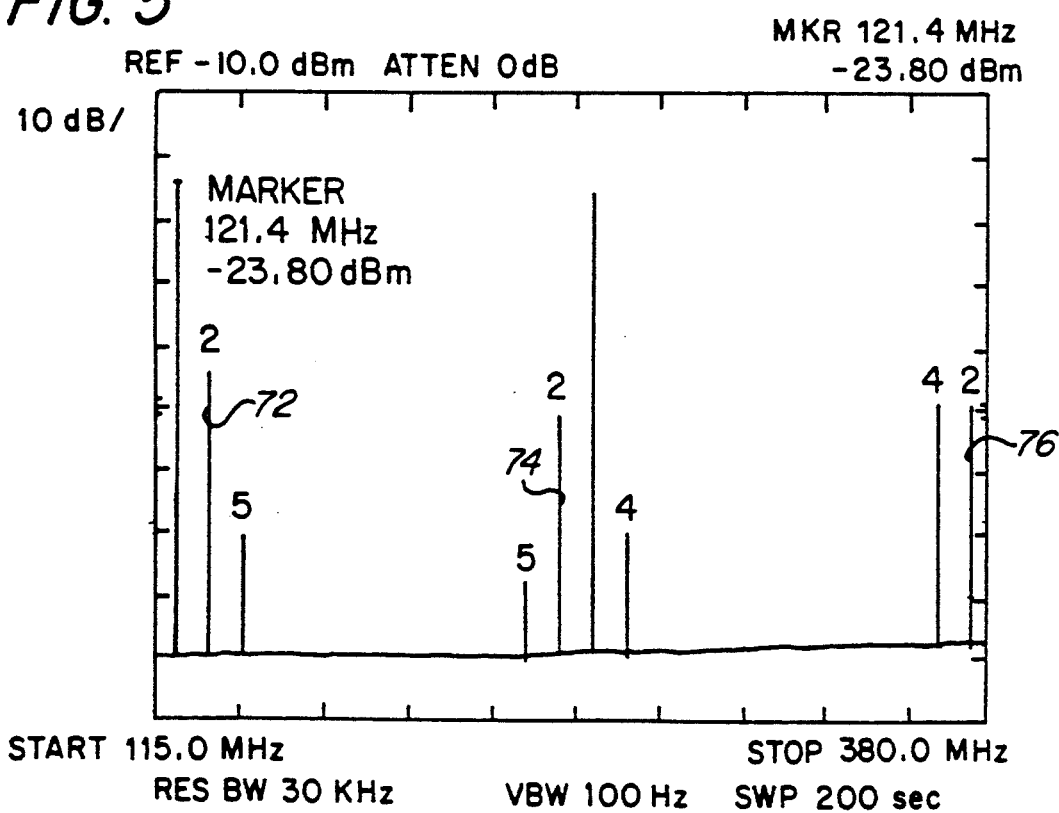
FIG. 5 is an input RF spectrum illustrating second, fourth and fifth order distortion products.

FIG. 5 illustrates the RF spectrum generated at the output of light source 10 when modulated with an RF input signal having two fundamental frequencies of 121.25 MHz and 253.25 MHz, respectively. The spectrum was obtained by coupling the output of optical isolator 20 directly to a fiber optic receiver. The output of the fiber optic receiver was, in turn, coupled to an RF spectrum analyzer. As shown in FIG. 5, the RF spectrum contained second, fourth and fifth order harmonics. Of particular interest are the second order harmonics 72, 74, and 76.

Figure 6:
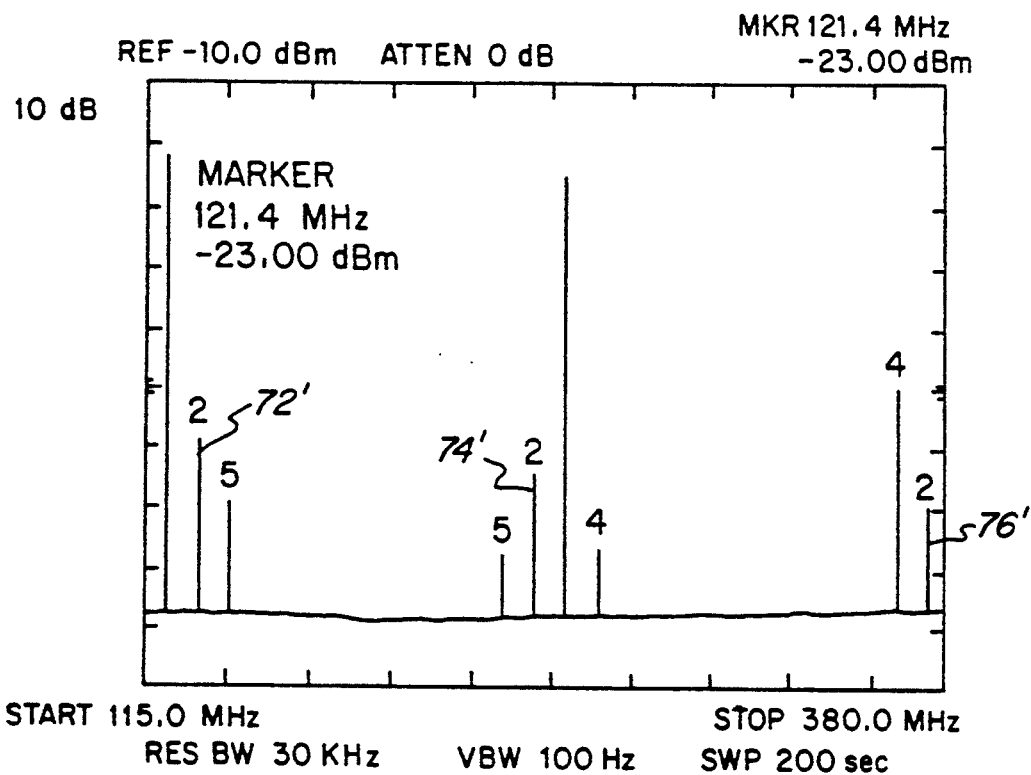
FIG. 6 is the RF spectrum of FIG. 5 with reduced second order components, produced at the output of an Erbium fiber optical amplifier in accordance with the present invention.

FIG. 6 illustrates the RF spectrum produced at the output of the optical fiber amplifier. This spectrum was measured at terminal 36 shown in FIG. 1. As indicated, each of the second order distortion products 72', 74', and 76' are reduced by 12 dB to 20 dB.

Although it is not fully understood why the doped fiber amplifier of the present invention reduces the second order components of an input AM-VSB multichannel television signal, the magnitude of the reduction is significant. One possible explanation is that the amplifiers demonstrate coherent subcarrier intermodulation distortion, wherein the second order distortion products are 180° out of phase with the second order products present in the input signal. It may also be that the reduction in second order distortion results from low inversion of portions of the doped fiber amplifier. If this proves to be the case, pump laser 24 should be operated at a power level insufficient to fully invert the amplifier.

In operation with a multi-channel AM-VSB television signal distribution system, it is anticipated that a pump laser having a wavelength of either 980 nm or 1480 nm will be used. A possible advantage of a 1480 pump laser wavelength is that single mode fibers are currently available at this wavelength. However, the noise figure (NF) at this wavelength is higher than that obtainable at a wavelength of 980 nm. A 980 nm wavelength is also advantageous since it is further from the anticipated operating frequency of the signal input laser, at about 1552 nm. It may therefore be preferable to develop fiber that is single moded at 980 nm to ensure efficient fiber pumping. The development of a 980 nm laser with sufficient reliability would also be required.

Figure 7:
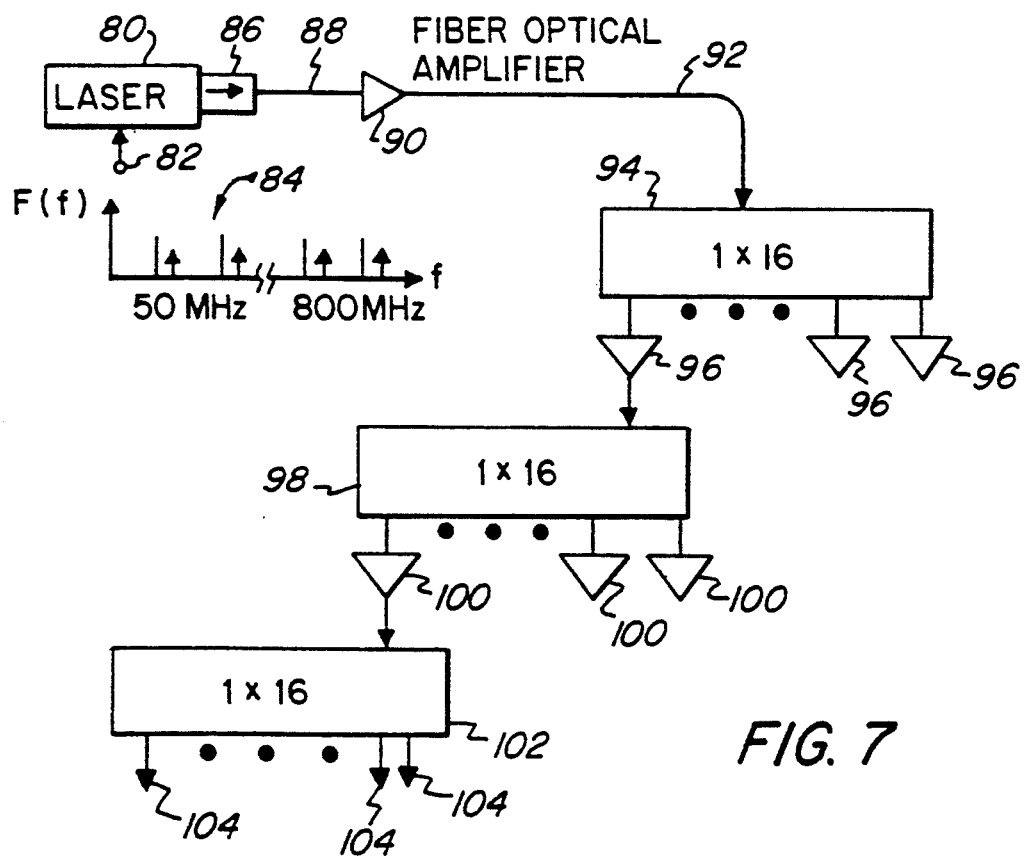
FIG. 7 is a block diagram illustrating the use of doped fiber amplifiers in a tree and branch cable television distribution network.

FIG. 7 illustrates an optical fiber tree and branch network for distributing AM subcarrier multiplexed information. A laser 80 is modulated with a signal input at terminal 82 to produce a modulated light signal. The modulating signal input to terminal 82 can comprise, for example, an RF cable television signal containing 30 or more channels of AM subcarrier video information. A frequency spectrum for such a signal is illustrated at 84.

The modulated light signal is passed through an optical isolator 86 which is coupled to an optical fiber 88. The light signal from fiber 88 is connected to a fiber optical amplifier 90, such as the Erbium doped fiber amplifier discussed in connection with FIGS. 1–6 above. The output of fiber optical amplifier 90 is coupled via optical fiber 92 to a first optical fiber splitter 94. Splitter 94 can split the incoming signal into any number of outputs. For purposes of illustration, a 1×16 splitter is shown. Splitter 94 will result in a signal loss, which may, for example, be on the order of 14 dB. If fiber optical amplifier 90 is selected to provide a +13 dBm output level, the light signal at the outputs of splitter 94 will be at a nominal level of −1 dBm. Another 3 dB of link loss is allowed in the fiber optic coupling between the output of splitter 94 and the input of another fiber optical amplifier 96. As shown in FIG. 7, each of the outputs of splitter 94 is coupled to a fiber optical amplifier 96, which in turn may be coupled to another splitter in the distribution network. A splitter 98 is illustrated with respect to one of the outputs of splitter 94. By providing fiber optical amplifier 96 with a gain of 17 dBm, the accumulated 4 dB loss at the input of amplifier 96 is compensated for, and the signal strength at the input of splitter 98 is again +13 dBm with respect to the original signal strength. Gain, noise and power characteristics of the fiber can be adjusted to be mutually compatible by adjusting various parameters including pump power, rare earth dopant concentration, fiber length and rare earth dopant profile.

A fiber optical amplifier 100 at the output of splitter 98 is designed to compensate for the accumulated loss resulting from splitter 98 and the coupling between splitter 98 and amplifier 100, to provide a +13 dBm signal strength at the input to yet another splitter 102 present in the distribution network. Those skilled in the art will appreciate that various splitters are used in a tree and branch distribution system of the type illustrated in FIG. 7. A fiber optical amplifier is provided at each output of each splitter to return the signal strength to a desired level. In the example illustrated in FIG. 7, signal splitter 102 has a plurality of outputs 104 that are fiber optic distribution end points, coupled via a broadband fiber optic receiver, to existing coaxial distribution equipment or a subscriber CATV converter.

One advantage of optical distribution as shown in FIG. 7 is that high bandwidth electrical amplifiers are not required between the cable television headend and the fiber optic distribution end point where the signal is converted back to the electrical domain. Elimination of the high bandwidth electrical components leads to a more reliable distribution network. Ultimately, a totally optical communication network is envisioned wherein multichannel AM-VSB television signals are distributed from the headend to each subscriber location solely on optical fiber.

It will now be appreciated that the present invention enables the transmission of an AM-VSB signal over an optical fiber. The use of a doped fiber optical amplifier having a long excited state lifetime with respect to the period of the AM-VSB signal overcomes the prior limitation of semiconductor amplifiers which introduce detrimental second order nonlinear intermodulation distortions. A further benefit derived from the use of the doped fiber optical amplifier is that it has been found to reduce second order distortion already present in an input signal. The amplifier may therefore be used in a fiber optic communication system for second order distortion reduction.

Although the invention has been described in connection with a preferred embodiment thereof, those skilled in the art will appreciate that numerous modifications and adaptations may be made thereto without departing from the spirit and scope of the invention as set forth in the following claims.

We claim:

1. An optical fiber tree and branch network for distributing AM subcarrier multiplexed information comprising:
   a first optical fiber splitter;
   an input on said splitter for receiving a modulated light signal carrying multiplexed AM subcarriers;
   a plurality of outputs on said splitter for distributing said modulated light signal; and
   means for amplifying the modulated light signal with an optical amplifier.

2. A network in accordance with claim 1 comprising:
   a plurality of additional optical fiber splitters, each having an input for receiving said modulated light signal from an output of a previous splitter and a plurality of outputs for distributing the modulated light signal,
   wherein said amplifying means amplifies the modulated light signal before it is input to each additional splitter.

3. A network in accordance with claim 2 wherein said amplifying means comprises a plurality of doped fiber amplifiers, each amplifying the modulated light signal input to a different splitter.

4. A network in accordance with claim 3 wherein said amplifiers are Erbium doped fiber amplifiers.

5. A network in accordance with claim 1 wherein said modulated light signal is provided by one or more lasers modulated with a cable television signal containing at least 30 channels of AM subcarrier video information.

6. A network in accordance with claim 1 wherein said optical amplifier has a long excited state lifetime with respect to the periods of said subcarriers.

7. A network in accordance with claim 1 wherein said optical amplifier is a doped optical fiber amplifier.

8. A network in accordance with claim 7 wherein said optical fiber amplifier is doped with a rare-earth element.

9. A network in accordance with claim 8 wherein said rare-earth element is erbium.

* * * * *